(12) United States Patent
Francois et al.

(10) Patent No.: US 11,679,577 B2
(45) Date of Patent: Jun. 20, 2023

(54) TIMEPIECE COMPONENT MADE OF COMPOSITE MATERIAL

(71) Applicant: The Swatch Group Research and Development Ltd, Marin (CH)

(72) Inventors: Nicolas Francois, Neuchatel (CH); Gregory Kissling, Macolin (CH); Stewes Bourban, Chabrey (CH); Juliette Muller, La Neuveville (CH); Jean-Luc Bazin, Tuescherz-Alfermee (CH)

(73) Assignee: The Swatch Group Research and Development Ltd, Marin (CH)

( * ) Notice: Subject to any disclaimer, the term of this patent is extended or adjusted under 35 U.S.C. 154(b) by 960 days.

(21) Appl. No.: 16/466,071

(22) PCT Filed: Dec. 19, 2017

(86) PCT No.: PCT/EP2017/083639
§ 371 (c)(1),
(2) Date: Jun. 3, 2019

(87) PCT Pub. No.: WO2018/115009
PCT Pub. Date: Jun. 28, 2018

(65) Prior Publication Data
US 2020/0061954 A1 Feb. 27, 2020

(30) Foreign Application Priority Data
Dec. 20, 2016 (EP) .................................... 16205356

(51) Int. Cl.
*B32B 3/12* (2006.01)
*B29C 45/14* (2006.01)
(Continued)

(52) U.S. Cl.
CPC .......... *B32B 3/12* (2013.01); *B29C 45/14008* (2013.01); *B29C 70/682* (2013.01);
(Continued)

(58) Field of Classification Search
None
See application file for complete search history.

(56) References Cited

U.S. PATENT DOCUMENTS

| | | |
|---|---|---|
| 2005/0127782 A1 | 6/2005 | Endo et al. |
| 2009/0085426 A1 | 4/2009 | Davis et al. |
| 2010/0285271 A1 | 11/2010 | Davis et al. |

FOREIGN PATENT DOCUMENTS

| | | |
|---|---|---|
| CN | 104057658 A | 9/2014 |
| CN | 105755307 A | 7/2016 |

(Continued)

OTHER PUBLICATIONS

Machine translation of Kawakami et al. (JP 2008-020265 A) translated via Espacenet on Feb. 28, 2022 (Year: 2008).*
Machine translation of CN 107417296 A (translated via FIT in Search) (Year: 2017).*
(Continued)

*Primary Examiner* — Elizabeth Collister
(74) *Attorney, Agent, or Firm* — Oblon, McClelland, Maier & Neustadt, L.L.P.

(57) ABSTRACT

The invention relates to a timepiece component made of composite material including at least one reinforcement and one matrix, the reinforcement having a three-dimensional honeycomb structure with a plurality of cells into which the matrix is injected.
The invention also concerns a method for manufacturing such a timepiece component.

14 Claims, 2 Drawing Sheets

(51) Int. Cl.
*B29C 70/68* (2006.01)
*G04B 37/22* (2006.01)
*B29L 31/60* (2006.01)
*C01B 32/158* (2017.01)

(52) U.S. Cl.
CPC .......... *C01B 32/158* (2017.08); *G04B 37/225* (2013.01); *B29L 2031/608* (2013.01)

(56) References Cited

FOREIGN PATENT DOCUMENTS

| | | | | |
|---|---|---|---|---|
| CN | 107417296 A | * | 12/2017 | ............. C04B 35/48 |
| EP | 2 784 600 A2 | | 10/2014 | |
| JP | 2008-20265 A | | 1/2008 | |
| JP | 2009-79941 A | | 4/2009 | |

OTHER PUBLICATIONS

International Search Report dated Mar. 9, 2018 in PCT/EP2017/083639 filed on Dec. 19, 2017.
Hanna, B. H. et al., "Mechanical Property Measurement of Carbon Infiltrated Carbon Nanotube Structures for Compliant Micromechanisms," Journal of Microelectromechanical Systems, vol. 23, No. 6, Dec. 2014, pp. 1330-1339, XP011565571.
Hutchison, D. N. et al., "Carbon Nanotubes as a Framework for High-Aspect-Ratio MEMS Fabrication," Journal of Microelectromechanical Systems, vol. 19, No. 1, Feb. 2010, pp. 75-82, XP011298225.
Japanese Office Action dated Jul. 28, 2020 in Patent Application No. 2019-529203 (with English translation), 6 pages.
Combined Chinese Office Action and Search Report dated Jul. 6, 2020, in Patent Application No. 201780078242.4 (with English translation), 15 pages.

* cited by examiner

TIMEPIECE COMPONENT MADE OF COMPOSITE MATERIAL

FIELD OF THE INVENTION

The invention relates to a timepiece component made of composite material, particularly a case middle, a bezel or a dial, wherein the composite material has a honeycomb reinforcement into which, for example, is injected a thermosetting resin.

The present invention also concerns a method for fabricating such a timepiece component.

BACKGROUND OF THE INVENTION

There are known from the prior art, and particularly from the aeronautic industry, components fabricated from sandwich panels made of composite materials obtained by placing resin-impregnated webs or fabrics on each of the two faces of an open-cell core usually formed by a honeycomb structure.

Because of their good mechanical features, composite sandwich panels are used in many fields, and particularly the aeronautic industry where the combination of lightness and good mechanical properties is particularly valued.

However, current composite sandwich panels cannot be adapted to timepieces and cannot be used to make small aesthetic parts with concave or convex shapes. They are also sensitive to wear and scratching.

SUMMARY OF THE INVENTION

It is a particular object of the invention to overcome the various drawbacks of these known techniques.

More precisely, it is an object of the invention to provide timepiece components made of a composite material having satisfactory mechanical properties, particularly good resistance to shocks, scratching and scuffing, while maintaining an attractive aesthetic appearance.

These objects, in addition to others which will appear more clearly hereinafter, are achieved according to the invention by means of a timepiece component made of composite material, the composite material including at least one reinforcement and one matrix, the reinforcement having a three-dimensional honeycomb structure with a plurality of cells into which the matrix is injected.

In accordance with other advantageous variants of the invention:
  the reinforcement having a honeycomb structure is made using a material chosen from synthetic fibres, natural fibres, metals including amorphous or partially amorphous metals, ceramics and thermoplastics;
  the matrix is chosen from thermosetting resins from the family of polyepoxides, from the family of acrylics, from the family of polyurethanes or the family of thermoplastics, such as polyetherketones or polyamides, polyurethanes, polyolefins, or from the family of elastomers such as polysiloxanes;
  the matrix includes an additive chosen from colorants, phosphorescent pigments, silica, carbon nanotube fillers or nanodiamond fillers.
  the cells are hexagonal in shape;
  the height of the cells is comprised between 0.5 mm and 2 mm;
  the length of the side of the cell is comprised between 0.5 mm and 2 mm.

The invention also concerns various methods for making a composite component including at least one reinforcement and one matrix, the reinforcement having a three-dimensional honeycomb structure with a plurality of cells into which the matrix is injected.

A first method, which has the advantage of making a composite structure component whose honeycomb cells are filled with a resin to have a composite aesthetic appearance (combination of a coloured reinforcement with the transparent or different coloured resin), includes the following steps:
  forming the reinforcement with a honeycomb structure,
  placing the reinforcement inside a mould,
  closing the mould and injecting the resin into the mould at a temperature T and a pressure P,
  keeping the mould closed at pressure P for the cooling phase,
  removing the component formed from the mould,
  subjecting the component to post-treatment, for example machining/polishing.

A second method, which has the advantage of making a component with a light, resistant and attractive composite structure, includes the following steps:
  forming the reinforcement with the honeycomb structure;
  closing the cells with two thin films of composite or metal materials;
  connecting the honeycomb cells and the thin films according to the nature of the materials by adhesive bonding, brazing, thermal welding or ultrasonic welding;
  placing the reinforcement inside a mould and injecting the resin
  closing the mould and injecting the resin into the mould at a temperature T and a pressure P,
  keeping the mould closed at pressure P for the cooling phase,
  removing the component formed from the mould,
  subjecting the component to post-treatment, for example machining/polishing.

According to other advantageous variants of the methods of the invention:
  the reinforcement having a honeycomb structure is made using a material chosen from synthetic fibres, natural fibres, metals including amorphous or partially amorphous metals, ceramics and thermoplastics.
  the matrix is chosen from thermosetting resins from the family of polyepoxides, from the family of acrylics, from the family of polyurethanes or the family of thermoplastics, such as polyetherketones or polyamides, polyurethanes, polyolefins, or from the family of elastomers such as polysiloxanes.
  the matrix includes an additive chosen from colorants, phosphorescent pigments, silica, carbon nanotube fillers or nanodiamond fillers.
  the matrix includes a combination of at least two additives.

BRIEF DESCRIPTION OF THE DRAWINGS

Other characteristics and advantages of the invention will appear more clearly upon reading the following description of a specific embodiment of the invention, given simply by way of illustrative and non-limiting example, and the annexed Figures, among which.

DETAILED DESCRIPTION OF PREFERRED EMBODIMENTS

The invention concerns timepiece components, such as case middles, back covers, bezels or dials or bracelet links, made of a particular composite material.

Figure 2A:
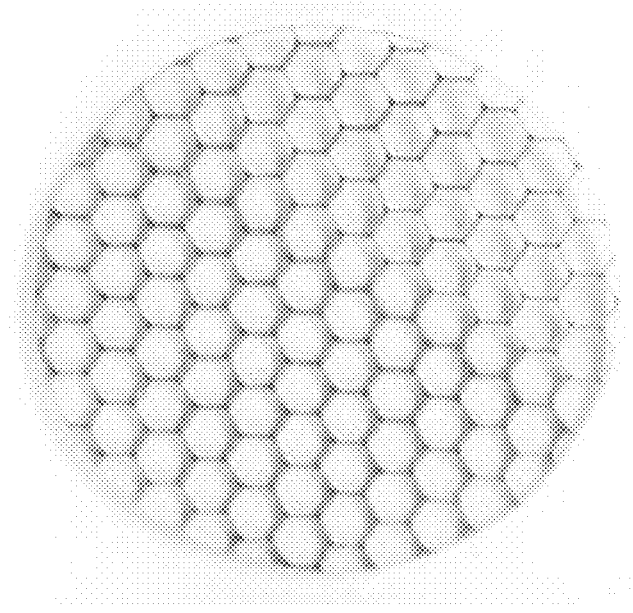
FIGS. 2a and 2b are respectively photographs of a watch case and its back cover made of composite material according to the invention.

As illustrated in FIG. 2a, the composite timepiece component according to the invention includes at least one reinforcement and one matrix, the reinforcement having a three-dimensional honeycomb structure with a plurality of cells, preferably hexagonal in shape, and into which the matrix is injected. Evidently, those skilled in the art could envisage other cell shapes as required.

According to the invention, the honeycomb structure forming the reinforcement can be made using a material chosen from synthetic fibres or natural fibres.

There is a large variety of synthetic fibres; within the scope of the invention, the fibres can be chosen from the following: carbon fibres, glass fibres, silica carbide fibres, ultra-high-molecular-weight polyethylene (UHMWPE) such as Dyneema®, Vectran® fibres, quartz fibres like Quartzel®, aramide fibres, silicon carbide fibres like Nicalon®, or polyethylene terephthalate fibres (PET).

According to an alternative of the invention, the fibres may be of natural origin such as linen fibres or cellulose fibres.

According to another embodiment of the invention, the honeycomb structure of the reinforcement can be made using metal materials, ceramics or thermoplastics.

For example, the honeycomb structure can be made of titanium; this metal has the advantage of having excellent damping and fatigue resistance properties. Once formed, the honeycomb structure obtained combines lightness, high resistance and good shock-absorbing properties.

Evidently, other metals or alloys can be used, such as gold, titanium, copper or aluminium. Amorphous or partially amorphous metals can also be envisaged.

Figures 1A, 1B:
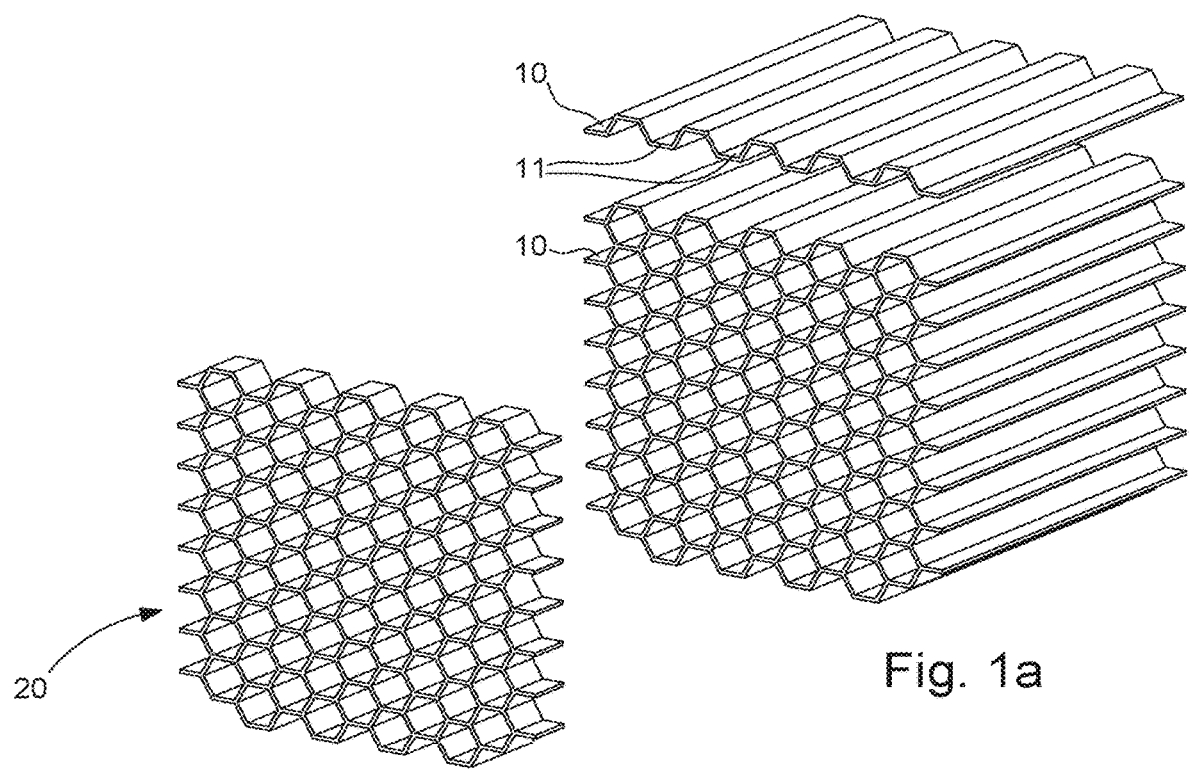
FIGS. 1a and 1b are perspective views of the making of a honeycomb structure.

To form the honeycomb structure, corrugated sheets can be used, for example thin metal sheets or prepregs. Corrugated sheets 10 are superposed and bonded or welded along their facets 11 in mutual contact, as illustrated in FIG. 1a. Honeycomb panels 20 are obtained directly by cutting the block of sheets perpendicularly to the corrugations, as illustrated in FIG. 1b.

It is also possible to use small metal or composite bands which are corrugated by stamping and then bonded to each other.

The honeycomb structure can also be made by 3D printing (metal powder sintering technology) or by machining (milling, laser, water jet) composite/metal plates. It is also possible to envisage a profile extrusion process with a honeycomb-shaped die to give the honeycomb reinforcement the proper shape; the latter can be re-machined.

According to the invention, the cells of the honeycomb structure have a height comprised between 0.5 mm and 2 mm, and an edge whose length is preferably comprised between 0.5 mm and 2 mm and more preferably between 0.5 mm and 0.8 mm. Evidently, the dimensions of the hexagonal cells can vary according to the type of timepiece components that it is desired to make. For example, to make a case back, a lower height will be necessary compared to the height required to make a case middle. It is also possible to vary the length of the cell edge according to the desired density of cells.

According to the requirements of those skilled in the art, and notably to obtain particular properties, the honeycomb structure can be made from a combination of fibres of different materials. For example, carbon fibres and ultra-high-density polyethylene fibres could be used in the same web to combine the high modulus of carbon and the high toughness of ultra-high-density polyethylene. According to another example, aluminium could be used to make the honeycomb structure.

Further, fibres such as Vectran®, PET or glass fibres, can be dyed in the mass during fabrication in order to obtain a particular aesthetic appearance, for example it is possible to envisage using coloured fibres to contrast with the matrix injected into the cells and thus better highlight the honeycomb structure. It is also possible to envisage alternating the colour of the fibres within a same fibre web.

In order to reinforce the honeycomb structure, a thermosetting resin type matrix is chosen according to the desired properties and is injected into the cells of the honeycomb structure. This resin may be an epoxy resin, an acrylic resin, a polyurethane resin or a polysiloxane resin. According to a preferred variant of the invention, the one-directional webs are pre-impregnated by applying the resin to the filaments before superposing the layers one top of the other.

It is to be noted that the term 'matrix' means a material that will coat and cover all or part of the honeycomb reinforcement.

In the case of a honeycomb structure made of metal material, in order to promote adhesion of the matrix, the thin films of metal material used to form the honeycomb structure can be micro-perforated so that the resin injected into the cells penetrates the thin films of metal material forming the cells and thus increases the toughness and durability of the assembly. According to a variant of the invention, the thin films of metal material can be textured by shot peening or by calendering or by etching or by surface laser so that the resin adheres better to the thin films of metal material forming the cells.

According to a particular embodiment of the invention, the resin can include carbon nanotube fillers or silicon carbide nanodiamond fillers, for example, so as to increase the tensile or flexural modulus or to improve scratch resistance. For example, adding 0.5% to 1.5% of nanodiamond fillers increases the hardness of the material, which increases the resistance of the timepiece component to scratching and friction.

The resin may also include coloured and/or photo-luminescent fillers like earth alkaline oxides doped with one or more lanthanides to give the timepiece component a particular aesthetic appearance when ambient light dims. According to this particularly advantageous variant, the fibre material is transparent like glass fibre and has a refractive index substantially equal to that of resin. For example, ideally, it will be chosen to combine glass fibre and acrylic resin which both have a refractive index of 1.5.

According to another variant, the phosphorescent pigments can be combined with specific fluorophores to obtain different day/night pairs of colours.

As a result of these various aspects of the invention, a robust composite component is obtained which can have a particular aesthetic appearance.

The invention also concerns a method for making a timepiece component from composite material, wherein the composite material includes at least one reinforcement and one matrix, the reinforcement taking the form of a three-dimensional honeycomb structure with a plurality of cells into which the matrix is injected.

In the first step, the reinforcement with a honeycomb structure is made and it could be cut into the desired shape, for example the shape of a watch case.

Next, the reinforcement is placed in a mould having the shape of the desired component, the mould is closed, and the matrix is injected into the mould at a temperature T and a pressure P so as to secure the resin to the structure by means of a step of curing or cross-linking the resin under pressure in a predetermined temperature cycle.

After cooling and maintaining at a pressure P, the component obtained can be finished by machining/polishing to ensure a good finish of the component.

Such a method makes it possible to fabricate timepieces from composite material conforming to the invention. Thus, watch cases, dials, plates, bridges, bezels, or flanges or links can be fabricated.

Such a material is particularly advantageous for providing timepieces that are particularly light and very resistant, together with a particular aesthetic appearance owing to the honeycomb structure which stands out from conventional composite materials.

Figure 2B:
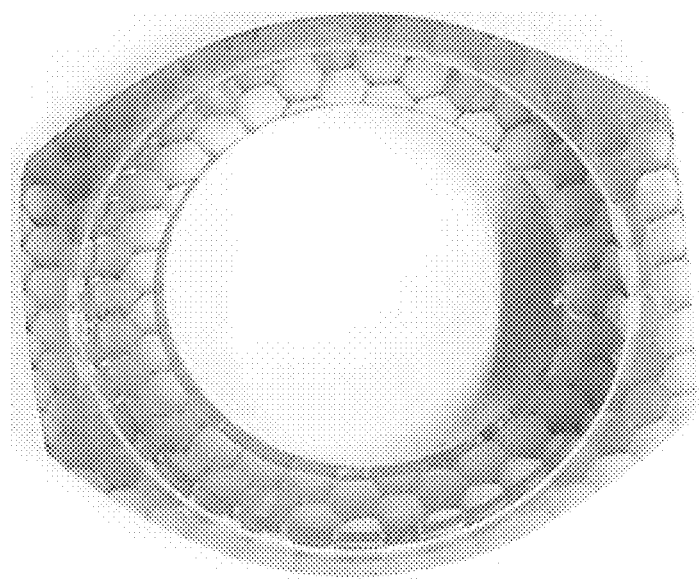

By way of illustrative and non-limiting example, a watch case and its back cover, seen in FIGS. 2a and 2b, can be made from a carbon fibre honeycomb structure with a 1% nanodiamond-reinforced epoxy resin, the watch case and back cover would combine the advantages of toughness, shock absorption, scratch resistance and lightness that are particularly sought after in horology.

Of course, the present invention is not limited to the illustrated example and is capable of various variants and modifications that will appear to those skilled in the art.

The invention claimed is:

1. An external timepiece element comprising a composite material comprising a reinforcement and a matrix, the reinforcement having a three-dimensional honeycomb structure with a plurality of cells into which the matrix is injected, the cells having a length between 0.5 mm and 2 mm,
   wherein the matrix is selected from the group consisting of an acrylic thermosetting resin, a polyurethane thermosetting resin, a thermoplastic resin, and an elastomer.

2. The external timepiece element according to claim 1, wherein the reinforcement having a honeycomb structure is made using a material selected from the group consisting of synthetic fibres, natural fibres, metals, ceramics and thermoplastics.

3. The external timepiece element according to claim 1, wherein the matrix comprises at least one additive selected from the group consisting of colorants, phosphorescent and/or fluorescent pigments, silica, carbon nanotube fillers and nanodiamond fillers.

4. The external timepiece element according to claim 3, wherein the matrix comprises a combination of at least two additives.

5. The external timepiece element according to claim 1, wherein the cells are hexagonal in shape.

6. The external timepiece element according to claim 1, wherein the height of the cells is from 0.5 mm to 2 mm.

7. A method for fabricating the external timepiece element according to claim 1, comprising:
   forming the reinforcement,
   placing the reinforcement inside a mould,
   closing the mould and injecting the matrix into the mould at a temperature T and a pressure P,
   keeping the mould closed at pressure P during cooling,
   removing the component formed from the mould, and
   subjecting the component to post-treatment.

8. The method according to claim 7, wherein the reinforcement having a honeycomb structure is made using a material selected from the group consisting of synthetic fibres, natural fibres, metals, ceramics and thermoplastics.

9. The method according to claim 7, wherein the matrix is selected from the group consisting of an acrylic thermosetting resin, a polyurethane thermosetting resin, and a polysiloxane thermosetting resin.

10. The method according to claim 7, wherein the matrix comprises at least one additive selected from the group consisting of colorants, phosphorescent or fluorescent pigments, silica, carbon nanotube fillers and nanodiamond fillers.

11. The method according to claim 10, wherein the matrix comprises a combination of at least two additives.

12. A method for fabricating the external timepiece element according to claim 1:
   forming the reinforcement having a honeycomb structure;
   closing the cells on both sides with two thin films of matrix materials;
   connecting the honeycomb structure and the thin films according to the nature of the materials by adhesive bonding, brazing, thermal welding or ultrasonic welding;
   placing the reinforcement connected to the thin films in a mould;
   closing the mould and placing it at a temperature T and a pressure P,
   keeping the mould closed at pressure P during cooling,
   removing the component formed from the mould, and
   subjecting the component to post-treatment.

13. The method according to claim 12, wherein the reinforcement having a honeycomb structure is made using a material selected from the group consisting of synthetic fibres, natural fibres, metals, ceramics and thermoplastics.

14. The method according to claim 12, wherein the matrix is selected from the group consisting of an acrylic thermosetting resin, a polyurethane thermosetting resin, and a polysiloxane thermosetting resin.

* * * * *